(12) United States Patent
Tyler (10) Patent No.: US 9,982,409 B1
(45) Date of Patent: May 29, 2018

(54) SYSTEMS, DEVICES, AND/OR METHODS FOR STABILIZING EARTH

(71) Applicant: Conwed Plastics Acquisition Company V LLC, Minneapolis, MN (US)

(72) Inventor: Rodney W. Tyler, Medina, OH (US)

(73) Assignee: Conwed Plastics Acquisition Company V LLC, Minneapolis, MN (US)

( * ) Notice: Subject to any disclaimer, the term of this patent is extended or adjusted under 35 U.S.C. 154(b) by 0 days. days.

(21) Appl. No.: 14/260,337

(22) Filed: Apr. 24, 2014

Related U.S. Application Data

(63) Continuation of application No. 13/742,754, filed on Jan. 16, 2013, now Pat. No. 8,740,503, which is a continuation of application No. 12/103,822, filed on Apr. 16, 2008.

(60) Provisional application No. 60/923,659, filed on Apr. 16, 2007.

(51) Int. Cl.
| | |
|---|---|
| *E02D 17/20* | (2006.01) |
| *E02D 3/00* | (2006.01) |
| *A01G 1/00* | (2006.01) |

(52) U.S. Cl.
CPC .............. *E02D 3/00* (2013.01); *A01G 1/001* (2013.01); *A01G 22/00* (2018.02)

(58) Field of Classification Search
CPC ............................. E02D 17/18; E02D 17/202
See application file for complete search history.

(56) References Cited

U.S. PATENT DOCUMENTS

| | | |
|---|---|---|
| 2,071,779 A | 2/1937 | Willing |
| 2,201,279 A | 5/1940 | Willing |
| 2,605,589 A | 8/1952 | Kuestner |
| 2,757,841 A | 8/1956 | Chapman |
| 2,842,297 A | 7/1958 | Friedman |
| 2,842,897 A | 7/1958 | Finn |
| 2,916,854 A | 12/1959 | Heigl |
| 3,214,866 A | 11/1965 | Halleck |
| 3,315,408 A | 4/1967 | Fisher |
| 3,320,696 A | 5/1967 | Wright |
| 3,362,106 A | 1/1968 | Goldring |
| 3,375,607 A | 4/1968 | Melvod |
| 3,597,928 A | 8/1971 | Pilaar |
| 3,617,566 A | 11/1971 | Oshima |
| 3,726,488 A | 4/1973 | Aasland |
| 3,861,603 A | 1/1975 | Lautzenheiser |

(Continued)

FOREIGN PATENT DOCUMENTS

TW    200700619 A    *    1/2007

OTHER PUBLICATIONS

Albright Seed Company, "Construction Site Erosion Costly, Illegal", Jan. 1, 1997, pp. 1-3, Streamline Publications, US.

(Continued)

*Primary Examiner* — Tara Mayo-Pinnock
(74) *Attorney, Agent, or Firm* — Michael Haynes PLC; Michael N. Haynes (57) ABSTRACT

Certain exemplary embodiments can provide a system comprising: a first tubular mesh enclosure having a first opposing pair of ends, at least one of said first opposing pair of ends sealed; a first filling surrounded by said first tubular mesh enclosure; a first geogrid wrapped at least partially around said first tubular mesh enclosure.

20 Claims, 6 Drawing Sheets

(56) References Cited

U.S. PATENT DOCUMENTS

| | | |
|---|---|---|
| 3,957,098 A | 5/1976 | Hepworth |
| 3,979,146 A | 9/1976 | Berg |
| 4,044,525 A | 8/1977 | Forsgren |
| 4,089,179 A | 5/1978 | Trautman |
| 4,297,810 A | 11/1981 | Hansford |
| 4,405,257 A | 9/1983 | Nielsen |
| 4,449,847 A | 5/1984 | Scales |
| 4,650,368 A | 3/1987 | Bayer |
| 4,729,691 A | 3/1988 | Sample |
| 4,788,936 A | 12/1988 | Billings |
| 4,799,821 A | 1/1989 | Brodersen |
| 4,934,094 A | 6/1990 | Walton |
| 5,015,123 A | 5/1991 | Houck |
| 5,030,031 A | 7/1991 | Brown |
| 5,108,224 A | 4/1992 | Cabaniss |
| 5,137,219 A | 8/1992 | Morey |
| 5,154,543 A | 10/1992 | Houck |
| 5,205,068 A | 4/1993 | Solomou |
| 5,226,255 A | 6/1993 | Robertson |
| 5,309,673 A | 5/1994 | Stover |
| 5,310,288 A | 5/1994 | Huang |
| 5,345,713 A | 9/1994 | Molnar |
| 5,358,356 A | 10/1994 | Romanek |
| 5,381,970 A | 1/1995 | Bold |
| 5,405,217 A | 4/1995 | Dias |
| 5,456,733 A | 10/1995 | Hamilton |
| 5,465,527 A | 11/1995 | Able |
| 5,481,827 A | 1/1996 | Decker |
| 5,507,845 A | 4/1996 | Molnar |
| 5,519,985 A | 5/1996 | Dyck |
| 5,538,860 A | 7/1996 | Castelli |
| 5,555,674 A | 9/1996 | Molnar |
| 5,570,973 A | 11/1996 | Hunt |
| 5,595,458 A | 1/1997 | Grabhorn |
| 5,597,732 A | 1/1997 | Bryan-Brown |
| 5,605,416 A | 2/1997 | Roach |
| 5,658,096 A | 8/1997 | Von Kanel |
| 5,669,732 A | 9/1997 | Truitt |
| 5,674,806 A | 10/1997 | Adamoli |
| 5,678,954 A | 10/1997 | Bestmann |
| 5,679,247 A | 10/1997 | Burke |
| 5,683,810 A | 11/1997 | Babbitt |
| 5,718,802 A | 2/1998 | Collier |
| 5,733,067 A | 3/1998 | Hunt |
| 5,735,982 A | 4/1998 | Prunty |
| 5,747,633 A | 5/1998 | Ito |
| 5,802,763 A | 9/1998 | Milstein |
| 5,806,445 A | 9/1998 | Decker |
| 5,824,725 A | 10/1998 | Lahalih |
| 5,854,304 A | 12/1998 | Garcia |
| 5,860,770 A | 1/1999 | Hunt |
| 5,906,436 A | 5/1999 | Cole |
| 5,934,027 A | 8/1999 | Khalili |
| 5,983,561 A | 11/1999 | Behrens |
| 5,988,942 A | 11/1999 | Atkinson |
| 6,027,054 A | 2/2000 | Kaye |
| 6,029,395 A | 2/2000 | Morgan |
| 6,042,305 A | 3/2000 | Novich |
| 6,085,810 A | 7/2000 | Castillo |
| 6,109,835 A | 8/2000 | Grabhorn |
| 6,113,789 A | 9/2000 | Burke |
| 6,135,672 A | 10/2000 | Davidson |
| 6,155,749 A | 12/2000 | Tanner |
| 6,171,984 B1 | 1/2001 | Paulson |
| 6,238,144 B1 * | 5/2001 | Babcock ...... 405/284 |
| 6,247,876 B1 | 6/2001 | Stephens |
| 6,281,001 B1 | 8/2001 | McNelly |
| 6,286,253 B1 | 9/2001 | Decker |
| 6,527,477 B1 | 3/2003 | Allard |
| 6,547,493 B2 | 4/2003 | Spangler |
| 6,627,434 B1 | 9/2003 | McNelly |
| 6,641,335 B1 | 11/2003 | Allard |
| 6,658,790 B2 | 12/2003 | Skuba |
| 6,709,202 B2 | 3/2004 | Spangler |
| 6,733,209 B2 | 5/2004 | Allard |
| 6,824,681 B2 | 11/2004 | Engwer |
| 6,893,193 B2 * | 5/2005 | Santha ...... 405/302.6 |
| 6,910,835 B2 | 6/2005 | Spangler |
| 6,913,423 B2 | 7/2005 | Spangler |
| 6,921,484 B2 | 7/2005 | Engwer |
| 6,951,438 B2 | 10/2005 | Carpenter |
| 7,029,208 B1 | 4/2006 | Santha |
| 7,056,057 B2 | 6/2006 | Marchant |
| 7,097,390 B1 | 8/2006 | Moss |
| 7,314,336 B2 | 1/2008 | Moss |
| 2001/0053545 A1 | 12/2001 | Engwer |
| 2002/0146394 A1 | 10/2002 | Stamets |
| 2003/0000139 A1 | 1/2003 | Anderson |
| 2003/0031511 A1 * | 2/2003 | Tyler ...... 405/15 |
| 2005/0254899 A1 * | 11/2005 | Tyler ...... 405/15 |
| 2006/0117653 A1 | 6/2006 | Werth |
| 2006/0236603 A1 | 10/2006 | Egan |
| 2006/0257212 A1 | 11/2006 | Kim |
| 2006/0280562 A1 | 12/2006 | Marxen |
| 2006/0291963 A1 | 12/2006 | Theisen |
| 2007/0036615 A1 * | 2/2007 | Kim ...... 405/284 |
| 2007/0095747 A1 * | 5/2007 | Theisen ...... B01D 39/083 210/503 |
| 2007/0110522 A1 * | 5/2007 | Kim ...... 405/284 |
| 2007/0280789 A1 * | 12/2007 | Mason ...... 405/302.6 |
| 2008/0193229 A1 | 8/2008 | Graham |

OTHER PUBLICATIONS

American Society for Testing and Materials, "Standard Specification for Wire Cloth and Sieves for Testing Purposes", Jan. 1, 1995, 5 pages, ASTM Int'l.

Barker, "Compost Utilization in Sod Production and Turf Management", Jan. 1, 2001.

Bentjen, "Bioremediation and Phytoremediation Glossary", [http://members.tripod.com/~bioremediation/], Jan. 1, 1998.

BioCycle, "The Art & Science of Composting", Jan. 1, 1991, 5 pages, JG Press, Inc.

Brinton, "Compost Quality Standards & Guidelines", Dec. 1, 2000, 44 pages, Woods End Research Laboratory, Inc.

California Integrated Wast Management Board, "Erosion Control", [http://www.ciwmb.ca.gov/Organics/Erosion/], Jan. 1, 2001, California Integrated Waste Management Board.

CCREF/USCC, "Compost Use on State Highway Applications", Dec. 20, 2002, 4 pages, Composting Council Research and Education Foundation; United States Composting Council.

Composting Council, "Field Guide to Compost Use", Jan. 1, 1996, Composting Council.

Electronic Code of Federal Regulations, "Title 40: Protection of Environment; Part 503", Feb. 19, 1993, 50 pages, e-CFR—Electronic Code of Federal Regulations.

EPA, "An Analysis of Composting As an Environmental Remediation Technology", Apr. 1, 1998, 116 pages, United States Environmental Protection Agency.

EPA, "Composting Yard Trimmings and Municipal Solid Waste", May 11, 1994, 151 pages, United States Environmental Protection Agency.

EPA, "Innovative Uses of Compost: Bioremediation and Pollution Prevention", Oct. 1, 1997, 6 page(s), United States Environmental Protection Agency.

EPA, "Innovative Uses of Compost: Erosion Control, Turf Remediation, and Landscaping", Oct. 1, 1997, 8 pages, United States Environmental Protection Agency.

EPA, "Organic Materials FactSheet: for everyone-from government agencies to entrepreneurs to homeowners", May 1, 2000, 6 pages, United States Environmental Protection Agency.

Federal Supply Service, "Federal Specification: Cloth, Burlap, Jute (or Kenaf); CCC-C467C", Feb. 8, 1972, 10 page(s), U.S. Federal Supply Service, General Service Administration, USA.

GDOT, "Standard Specifications Construction of Transportation Systems, 2001 edition: Section 201 Clearing and Grubbing Right of Way", Jun. 21, 2001, 6 pages.

GDOT, "Standard Specifications Construction of Transportation Systems, 2001 edition: Section 881-Fabrics", Jun. 21, 2001, 9 pages.

(56) References Cited

OTHER PUBLICATIONS

Giles, "Fluid Mechanics & Hydraulics", Jan. 1, 1962, 19 pages, McGraw-Hill, Inc.
Glass, "U.S. and International Markets for Phytoremediation, 1999-2000", [http://www.channel1.com/dglassassoc/INFO/phy99exc.htm], Jan. 1, 1999, D. Glass Associates, Inc.
Hallee, "Composting Cull Potatoes", Apr. 1, 1997, 4 pages, University of Maine Cooperative Extension.
Huffman, "Phytoremediation", [http://www.woodrow.org/teachers/bi/1998/bioremediation/], Jan. 1, 1998, WWLPT Biology Institute.
HydraulicSupermarket.com, "Velocity and Pressure Drops in Pipes", Jan. 1, 2000, 5 pages, HydraulicSupermarket.com.
Keating, "Compost Coverage", May 1, 2001, pp. 30-35, Erosion Control.
Keating, "Seeding: Success is all in the Techniques", Jan. 1, 2002, 46, pp. 48-52, Erosion Control.
Land and Water, "Land and Water", Mar. 1, 2002, pp. 1-72, Land and Water, Fort Dodge, IA, US.
Lenhart, "The Stormwater Management StormFilter", Jan. 1, 1997, 252-258 page(s), Stormwater Management™, US.
Missouri Botanical Garden, "Phytoremediation", [http://www.mobot.org/jwcross/phytoremediation/phytorem_reviews.htm], Jan. 1, 2001, Missouri Botanical Garden.
Nraes, "Composting for Municipalities", Nov. 1, 1998, p. 113, National Resource, Agriculture, and Engineering Service.
Rock, "Phytoremediation", Seminar Series on Bioremediation of Hazardous Waste Sites: Practical Approaches to Implementation, Jan. 1, 1998, 9 pages.
Seedland, Inc., "How to Sod", Oct. 13, 1999, 3 page(s), retrieved Nov. 19, 2009 from http://web.archive.org/web/19991 013095347/ http://sodding.com/sodding/index.html.
Sullivan, "Compost Quality Attributes, Measurements, and Variability", Jan. 1, 2001, 26 page(s), CRC Press LLC.
Tyler, "Compost's Next Wave", May 1, 2002, 34 page(s), Waste Age.
USDA, "Planning and Design Manual for the Control of Erosion, Sediment, and Stormwater: Chaper 4: Best Management Practice Standards—Silt Fence", Apr. 1, 1994, 9 pages, http://www.abe.msstate.edu/csd/p-dm/.
Walker, "U.S. Environmental Protection Agency Regulations Governing Compost Production and Use", Jan. 1, 2001, 19 page(s), CRC Press LLC.
Washington State University, "Pipe Pressure Loss Calculator", Jan. 1, 2001, 1 page, available at http://irrigation.wsu.edu/pipefriction.php.

\* cited by examiner

SYSTEMS, DEVICES, AND/OR METHODS FOR STABILIZING EARTH

CROSS-REFERENCES TO RELATED APPLICATIONS

This application claims priority to, and incorporates by reference herein in its entirety, U.S. Provisional Patent Application Ser. No. 60/923,659, filed 16 Apr. 2007.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Certain exemplary embodiments, sometimes referred to herein as GreenLoxx™ and/or available from Filtrexx International of Grafton, Ohio (hereinafter "Filtrexx") (web site accessible at Filtrexx.com), can provide a vegetated mechanically stabilized earth ("MSE") system that can be reinforced with vegetation and/or geotextile support to form a wall that "locks" into the adjacent earth and/or a desired position and/or orientation. The locking mechanism can be created by the integration of a geogrid, compacted backfill, vegetation, and/or a fascia made from elongated tubular mesh enclosures, such as a Filtrexx FilterSoxx™ (sometimes referred to herein as "Soxx"), which can be filled with a filler and/or growing medium, such as Filtrexx GrowingMedia™.

Certain exemplary embodiments can rely on GrowingMedia™ to provide a fertile growing medium that can encourage vegetation establishment and/or assist in anchoring roots of the vegetation to the wall and/or the site substrate. Certain exemplary embodiments can provide:
- a living, vegetated, and/or green retaining wall and/or wall fascia;
- higher aesthetic appeal;
- greater erosion control, environmental, and/or filtering functionality; and/or
- a more stable retaining wall system.

Application

GreenLoxx™ can be to be used where other retaining walls are specified. These locations can include but are not limited to:
- Steep embankments
- Roadside slopes
- Road underpasses (culverts)
- Storm water outfalls
- Stream banks
- Shoreline slopes
- Residential retaining walls GreenLoxx™ can be comprised of any of 5 primary components:
- Filtrexx Soxx™ can be used as the vegetated fascia;
- Filtrexx GrowingMedia™ can be used to fill the Soxx™;
- a geogrid can be wrapped around the filled fascia Soxx™;
- compacted backfill can be placed behind the fascia; and/or
- vegetation can be grown through the Soxx.

These components, and/or their equivalents, can work together to establish a system of Mechanically Stabilized Earth (MSE) with a vegetated fascia.

Certain exemplary embodiments can:
- provide construction components that are relatively light in weight;
- avoid utilizing a poured concrete footing;
- incorporate seed throughout the fascia profile and/or within the FilterSoxx;
- provide a growing medium that establishes, sustains, and/or provides reinforcement for vegetation;
- provide the ability to bind and/or absorb soluble nutrients, metals, contaminants, and/or organic chemicals that can be comprised by storm water runoff and/or leachate, thereby reducing loading to adjacent receiving waters;
- provide microorganisms in the growing medium that have the ability to degrade and/or cycle captured nutrients, metals, contaminants, and/or organic chemicals into beneficial and/or less toxic forms;
- provide physical structure for seed, seedlings, and/or live stakes;
- provide increased water holding capacity and/or reduced water evaporation to aid in seed germination, plant sustainability, and/or the potential for reduced irrigation;
- provide improved germination, moisture management, and/or irrigation in arid and/or semiarid regions;
- provide organic nutrients that release relatively slowly for improved and/or optimum efficiency to establishing vegetation;
- provide organic nutrients that are less prone to runoff transport and/or pollution of surface waters, relative to mineral nutrients supplied by fertilizers;
- provide a suitable conduit for a low volume and/or low pressure drip tape irrigation system installed within the FilterSoxx fascia to promote vegetation establishment;
- easily utilize reinforcing for challenging applications;
- provide improved drainage and/or reduction of hydrostatic pressure over conventional structural walls;
- provide for customizable vegetation using plugs, live stakes, seed, sprigs, and/or bulbs;
- allow for faster installation than conventional walls;
- provide support to both top and/or bottom of each layer of the fascia;
- allow for fascia that is installed in continuous lengths, thereby reducing the presence of breaks and/or potential weak points in the structure; and/or
- create individual terraces on each level of the fascia, thereby further facilitating vegetation growth;
- provide a Bodkin-Type Connection to connect each grid layer to the previous grid layer;
- connect each successive fascia layer to the previous fascia layer;
- provide vertical and/or near vertical batters and/or collections of FilterSoxx;
- create a continuous horizontal fascia having no vertical breaks;
- allow for custom plant mixes within the fascia;

present sufficiently sized openings for vegetation establishment; and/or provide a fascia having relatively low heat absorption properties.

Material Specifications

In certain exemplary embodiments, the components of the GreenLoxx™ wall can work together to establish a system of Mechanically Stabilized Earth (MSE) with a vegetated fascia. Note that backfill and/or geogrid requirements can be specific to each project and/or typically are reviewed by a Professional Engineer.

Filtrexx Soxx™

In certain exemplary embodiments, the fascia of the GreenLoxx™ wall can be comprised of knitted and/or extruded tubular geotextile units, such as Filtrexx Soxx™. Soxx™ can be specifically designed to retain Filtrexx GrowingMedia®, seed, and/or live stakes to promote healthy vegetation growth. This system also can be designed to reduce hydrostatic pressure by increasing drainage of surface and/or run-on/runoff and/or subsurface flow to the vegetated fascia. The openings in the Soxx™ can allow for root growth while retaining GrowingMedia™ for healthy and/or sustainable vegetation. The Soxx™ can be installed in continuous sections, reducing the number of joints in the system that typically occurs with other block structures. These continuous sections can allow the GreenLoxx™ fascia to act as a beam across the slope, thereby distributing any acting pressures.

Filtrexx FilterSoxx™ wall fascia units typically are available in diameters of 8 in (200 mm), 12 in (300 mm), 18 in (450 mm), 24 in (600 mm), and/or 32 in (800 mm), and/or typically are constructed of any of a variety of materials and/or characteristics (see Table 10.2). The specific size of the FilterSoxx™ for each site typically will vary based on intended height of the application, intended batter, and/or spacing of geogrid and/or other anchoring/tieback system. Typically, FilterSoxx™ for GreenLoxx™ applications range in diameter from 12 in (300 mm) to 24 in (600 mm). The FilterSoxx™ can be constructed from polypropylene, treated UV-resistant material, monofilament, HDPE, rayon, polyester, and/or shade cloth, etc.

GrowingMedia™ Characteristics

In certain exemplary embodiments, GreenLoxx™ can use Filtrexx GrowingMedia™, which can be designed specifically for stability within the system and/or establishment and/or sustainability of vegetation growth. Filtrexx GrowingMedia™ can be third party tested and/or certified to meet minimum performance criteria defined by Filtrexx International. Specified performance parameters can include: vegetation growth, water holding capacity, pH, organic matter, soluble salts, moisture content, biological stability, maturity bioassay, percent inert material, bulk density and/or particle size distribution, etc. In certain exemplary embodiments, blends of GrowingMedia™ with additional inorganic materials can be utilized to meet local site requirements (e.g., sand, soils, aggregates, etc).

Geogrid Reinforcement

In certain exemplary embodiments, a geogrid can be utilized. A wrap of geogrid typically is recommended for every course when lifts are 18 in (450 mm) and/or larger and/or every one to two courses for 8 in (200 mm) and/or 12 in (300 mm) lifts. Therefore, as geogrid spacing varies, FilterSoxx™ wall fascia size (8 in and/or 200 mm to 30 in and/or 750 mm) can be adjusted to meet the grid-spacing requirements as determined by the site engineer.

Geogrid Length

In certain exemplary embodiments, a geogrid length can be specified as a minimum of 0.6 times the height of the wall per lift. Lengths can increase with increased slope, loading, soil conditions and/or acting pressures. Site specific engineering from a locally registered Professional Engineer can be utilized.

Construction of Footer for Structural Stability

Although a concrete footer is not necessary required for GreenLoxx™, a stable foundation can be provided, such as by using Soxx™ filled with inorganic materials, such as rock, compactable gravel, and/or other suitable materials. An optional aggregate filled FilterSoxx™ can be substituted on the bottom layer in GreenLoxx™ The bottom Soxx™ can be buried and/or keyed in to increase stability so that the depth is equal to approximately 10% of wall height. Depth can be determined by site-specific engineering.

Vegetation Choices

Examples of vegetation that can be selected include:
Grasses including natives
Vines and/or groundcover, including ivy, myrtle, etc.
Wildflowers
Perennials
Annuals
Small shrubs, particularly if incorporated with process of building GreenLoxx™

Vegetation Selection

Successful planning for any vegetation establishment project can consider aesthetics, wildlife habitat, climate, prevailing weather, temperature, sun exposure, prolonged moisture exposure, available moisture/irrigation requirements, topography, soil type, soil pH, soil amendments, nutrient requirements, drought tolerance, time/coordination with construction phases, site preparation/coordination with construction phases, protection from erosion and/or sedimentation, concentrated flow and/or runoff velocity potential, maintenance, and/or seed mix/plant selection.

Quick establishing annual grasses and/or legumes can be specified for temporary and/or nurse crop applications. Perennial grasses can be specified for permanent applications. Native grasses can be utilized as these can be better adapted to local climate, native soil, and/or hydrology. If GreenLoxx™ system will be exposed to prolonged moisture, wetland/or species can be utilized. Tall and/or sturdy grasses can be better at reducing runoff and/or flow velocity and/or increasing sediment removal than low growing, flexible grasses and/or legumes, as taller vegetation generally increase surface roughness values. Additionally, deep rooted grasses can be more stable under high storm runoff and/or high flow velocity.

GreenLoxx™ can be designed for biotechnical engineering applications. GrowingMedia™ fill within the FilterSoxx™ system can create an optimum fertile and/or structural environment for establishing and/or sustaining live stakes, seed, tubers, rhizomes, and/or plugs, etc. As used herein, the term "live stake" means an approximately 1 to 3 foot long cutting from a live hardwood tree and/or shrub that is planted vertically, such as into a GrowingMedia™. Typical live stake species include willow, poplar, maple, cottonwood, dogwood, sycamore, and/or oak. Drip tape irrigation installed within the GreenLoxx™ system can maintain moisture for plants used in biotechnical engineering projects, particularly in drought prone regions and/or seasons.

Local landscape architects, NRCS personnel, and/or cooperative extension specialists can be consulted and/or used as resources for local/regional seed and/or plant selection. Many state erosion and/or sediment control and/or storm water management manuals have specifications for seed and/or plant selection, seeding rates, and/or planting requirements. VegSpec, a design program created by the USDA-NRCS, can be a helpful tool for seed and/or plant selection. It can be accessed on the web at vegSpec.nres.usda.gov/vegSpec/index.jsp.

Establishing & Sustaining Vegetation

In certain exemplary embodiments, GreenLoxx™ can be seeded at the time of application by injection into GrowingMedia™ during GreenLoxx™ construction. Nurse crops, such as annual rye, oats, millet, and/or wheat can be utilized to establish a quick vegetative cover until perennial grasses and/or live stakes are established. Grasses within the GreenLoxx™ can be mowed and/or maintained between approximately 4 in (100 mm) and/or approximately 10 in (250 mm) high, unless otherwise specified. Taller grasses can have higher sediment removal efficiency, sediment storage capacity, and/or a greater ability to dissipate runoff energy and/or reduce storm flow velocity relative to low growing and/or low maintained grasses. Live stakes can be approximately 1 to approximately 3 feet (300-900 mm) long and/or planted vertically with approximately 2 inches of one end planted into a GrowingMedia™ and/or spaced 3 to 5 feet (1-1.5 m) apart).

Although GrowingMedia™ typically has a higher water holding capacity than topsoil, irrigation can be utilized to ensure successful establishment. In arid and/or semi-arid regions and/or hot and/or dry weather, regular irrigation can be utilized. Drip tape irrigation can be installed within the FilterSoxx™ to maintain moisture within the GrowingMedia™ for establishing vegetation and/or in drought prone regions and/or seasons.

GreenLoxx™ GrowingMedia™ can supply humus, organic matter, beneficial microbes, and/or slow release organic nutrients that can contribute to increased fertility, plant health, and/or sustainability.

Organic vs. Fertilizer Nutrients

Although most specification and/or design manuals include fertilizer recommendations and/or requirements for vegetation, mineral nutrients from fertilizers might not be preferable where vegetation sustainability and/or water quality are a concern. GreenLoxx™ can provide organic nutrients that are slow release, provide plant micronutrients, and/or are less likely to be transported in storm runoff to receiving waters, which can otherwise lead to pollution and/or eutrophication of waterways.

Weed Establishment

Invasive weed growth has been more closely associated with mineral fertilizer than organic fertilizer fertility practices. Vegetation practices can be inspected for invasive and/or noxious weeds.

Establishing Vegetation

Potential Methods for establishing vegetation can include:
Plant Plugs that are approximately 2 inches×approximately 2 inches (50 mm×50 mm) or smaller
Live stakes
Bulbs and/or dormant rootstocks buried in GreenLoxx during construction
Sprigs
Annual and/or perennial plants
Injection of seed into the FilterSoxx™ and/or pre-mixing seed and/or GrowingMedia™ prior to filling
Broadcast seeding, especially natives and/or wildflowers Performance A local registered Professional Engineer can determine appropriate performance tests using recognized engineering performance testing and/or standard specifications for materials. These can include any of the following:
American Society for Testing and/or Materials (ASTM):
C1372—Standard Specification for Segmental Retaining Wall Units
C33-93—Specifications for Concrete Aggregates
D698—Test method for Laboratory Compaction Characteristics of Soil Using Standard Effort
D424—Atterburg Limit of Soils
D422—Gradation of Soils
D5262—Test Method for Evaluating the Unconfined Tension Creep Behavior of Geosynthetics
D4355—Test Method for Deterioration of Geotextiles from Exposure to Ultraviolet light
Geosynthetic Research Institute (GRI)
GG1—Standard Test Method for Geogrid Rib Tensile Strength
GG4—Standard Practice for Determination of Long Term Design Strength of Geosynthetic Reinforcements
GG5—Standard Test Method for Determination of Geogrid Pullout Using Geogrid for Reinforcement In certain exemplary embodiments, geogrid can be wrapped around the entire fascia, thereby providing support to the top and/or bottom of the fascia and/or preventing movement of the FilterSoxx™ from within the wrapped layer. There can be situations where the geogrid wrap can cover more than one layer of FilterSoxx™. Because the FilterSoxx™ fascia can be permeable, it can retain less water than a block wall and/or can prevent soil saturation, mass wasting of soil, and/or hydrostatic pressure behind the fascia.

Installation

Tools and/or Materials
Potential installation tools and/or materials can include:
Normal soil working tools such as shovels, rakes, hand compactor, broom, and/or pick, etc.
Mechanical compactor
Pneumatic blower truck capable of reaching remote areas
Mechanism for blending seed and/or GrowingMedia to be used in Soxx
Filler cone for filling Soxx
geogrid meeting specifications for site conditions
non-woven geotextile meeting site conditions
Filtrexx Soxx
Tie-wraps (e.g., approximately 8 inch and/or 200 mm)
Sod staples (e.g., approximately 8 inch and/or 200 mm)
Rebar stakes (e.g., approximately 0.5 inch)
Wooden stakes (e.g., approximately 2 inch (50 mm)× approximately 2 inch (50 mm)×approximately 3 to 4 feet long (1-1.2 m)).
Repelling gear/safety harness/tie off equipment
Traffic control and/or safety measures, where required
Duck bill and/or Manta Ray anchors and/or equivalent, as needed
Driving rods for anchors
Hammer and/or other driving mechanism to achieve proper anchor depth and/or load capability Excavation and/or Base Preparation Prior to construction, the area of excavation can tightly fit the first layer of FilterSoxx™ to create a firm foundation (see Image 3). Temporary sediment control devices, such as Filtrexx SiltSoxx™, can be used to minimize run-off and/or erosion.

The foundation area can be compacted using a plate compactor and/or equivalent prior to adding any fill and/or the first course of FilterSoxx™. No footings are required for GreenLoxx™; however, a level base that is buried a predetermined depth, such as approximately 10% of the wall height, can be utilized.

Drainage

Unlike hard-walls, a drainage zone behind the face of the GreenLoxx™ need not be required as the FilterSoxx™ fascia can be highly permeable. This permeability can greatly reduce hydrostatic pressure and/or facilitate hydration of the GrowingMedia™ and/or fascia vegetation. Where increased drainage is desired and/or required for high-flow areas, stone can be added to the GrowingMedia™ in the first and/or second FilterSoxx™ course to enhance the movement of subsurface and/or runoff flow. As with other retaining walls, additional drainage systems can be installed behind the wall. Drainage requirements can be addressed by a geotechnical engineer and/or hydrologist.

An optional "drainage layer" can be advisable in some situations, and can be accomplished using, for example approximately 8 inch (300 mm) diameter FilterSoxx™ filled with pea gravel, #8 limestone, and/or aggregate of equivalent and/or suitable size. This material can be stacked in a vertical layer between the existing soil and/or the GreenLoxx™ system, to facilitate drainage away from existing soil before entering the structural fill, and/or to have an area of emergency drain relief caused by runoff and/or subsurface flow. Benefits of using FilterSoxx™ can include more accurate estimates of quantity of stone needed for drainage layers and/or keeping the stone confined to a permanent drainage layer.

Base Course

After the initial excavation, fine-tuning of the base surface can commence, such as via using a laser-level to prepare a base surface sufficiently level for the first course of FilterSoxx™. The surface can be free of roots and/or rocks that can interfere with the FilterSoxx™ and/or result in an uneven surface.

After preparation of the base surface, an approximately 8 inch (200 mm) layer of granular material can be placed over the native material, including within any the trenched section. A layer of semi-porous geogrid can be used to separate the granular fill from the native soil. The granular material can be applied manually, by excavator, and/or by pneumatic blower (see Image 4).

For projects where geogrid is required, the geogrid can be laid down prior to placement of FilterSoxx™ and/or wrapped around the FilterSoxx™ fascia.

After placing and/or compacting the base material the first course of geogrid can be installed. The geogrid can be placed over the granular material and/or fastened with sod staples and/or rebar stakes to temporarily anchor the geogrid while commencing work. Once the geogrid is anchored, a FilterSoxx™ of the desired length can be installed horizontally and/or parallel to the wall face (see Image 5). The Filtrexx FilterSoxx™ can be filled in place, such as at the base of the wall, and/or if present, in the trench (see Image 6).

When installing geogrid, the installer can assure that it is laid flat over the backfill. The geogrid can be pulled back to ensure good connection with the FilterSoxx™ fascia and/or to remove any folds in the material. Wooden stakes (e.g., approximately 2 inch (50 mm)×approximately 2 inch (50 mm) stakes and/or approximately 0.5 inch (12.5 mm) re-bar can be used to "pin" the geogrid until backfill is placed over the geogrid. Note that the geogrid type, strength, and/or spacing can vary between manufacturers.

Non-woven geotextile can be placed to separate native and/or structural backfill. Then, structural backfill can be applied with an excavator and/or pneumatic blower. Fill can be placed and/or compacted using approximately 6-12 inch (150-300 mm) lifts. Native backfill can be applied with an excavator and/or pneumatic blower (see Image 7). Note that a typical compaction of fascia when using 12 inch (300 mm) and/or 18 inch (450 mm) diameter FilterSoxx™ can result in approximately 30% reduction in height (8 in [200 mm] and/or 12 in [300 mm] lift, respectively—see table 10.2). To reduce this compaction, pressure can be exerted on the geogrid to pull tight against the fascia, reducing compaction and/or increasing height.

Succeeding Courses

Successive courses can be set upon previous courses in a batter and/or pattern prescribed by the site engineer (see Image 8). FilterSoxx™, aggregate, and/or native soil and/or backfill can continue to be placed as needed.

Hand compaction and/or weight of successive layers can compact the FilterSoxx™ fascia by approximately 30%, and the amount of compaction can be adjusted, such as by the project engineer and/or installer to achieve a specified and/or desired wall height.

Backfill Compaction

The backfill type can be specified and/or proctor tests can be conducted using standard AS™ testing procedures and/or equivalent field procedures.

Compaction of materials can vary with soil type, but typically, smaller lifts of material (less than approximately 12 inch [300 mm]) can be easier to compact.

For more information, see GreenLoxx™ design details in FIGS. 10.1 to 10.3.

Final Seeding—Cap

The top of the wall and/or "cap" can utilize a Compost Vegetated Cover™ and/or a Compost Storm Water Blanket™, which are available from Filtrexx and described on their web site at Filtrexx.com. Each of these products can effectively join the GreenLoxx™ system with any existing vegetation and/or terrain.

Prior to seeding the top of GreenLoxx™, the upper layer of geogrid can be buried to a minimum of approximately 6 inches (150 mm). FilterSoxx™ can be used to complete the cap in combination with final seeding (see Image 10).

Inspection

Regular inspections can be conducted that are within local, state, and/or federal guidelines for water quality regulations. A minimum of approximately 70% uniform cover for vegetation within 2 seasons can be targeted. Areas that lack vegetation can be spot seeded using a compost/seed mixture.

After six months, if 70% uniform cover of nurse crop has not occurred reseeding and/or remedial planting can be preformed.

Potential Maintenance

Any of the following maintenance activities can be performed:

The GreenLoxx can be maintained in a functional condition and/or can be routinely inspected.
  Seeded GreenLoxx can be maintained until a minimum uniform 70% cover of the applied area has been vegetated, permanent vegetation has established, and/or as required by any regulatory body.
  Seeded GreenLoxx can be irrigated in hot and/or dry weather and/or seasons, and/or arid and/or semi-arid climates to ensure vegetation establishment.
  Where a GreenLoxx fails and/or becomes dislodged, product can be repaired to be in good contact with the soil and/or backfill media.

Where bank and/or shoreline erosion occurs, the soil can be regarded if necessary the GreenLoxx repaired and/or replaced.

Where vegetation does not establish, one can reseed, replant, replace live stakes, and/or provide an approved and/or functioning alternative.

If GreenLoxx is only seeded at time of installation, live stakes can be added to increase stability, aesthetics, wildlife habitat, and/or ecological succession.

No additional fertilizer and/or lime is necessarily required for vegetation establishment and/or maintenance.

No disposal is necessarily required for this product/practice.

GreenLoxx can become part of the permanent landscape.

Regular mowing of grass vegetation on seeded GreenLoxx to a minimum height of, for example, approximately 4 inches (100 mm) and/or a maximum height of, for example, approximately 10 inches (250 mm), can deter invasive weeds, allow sunlight to kill captured pathogens from storm water, and/or provide maximum sediment removal efficiency and/or sediment storage capacity in the vegetation.

Storm debris and/or trash deposited on GreenLoxx can be removed as desired.

Sediment can be removed if it reaches, for example, approximately 25% of the height of the vegetation (mowed), to prevent diversion of storm runoff and/or reduction of vegetation health and/or cover.

If drip tape irrigation system is installed, once vegetation is fully established, connections to drip tape irrigation system can be removed, leaving the drip tape inside the FilterSoxx™.

TABLE 10.2

GreenLoxx ™ FilterSoxx ™ Wall Fascia Sizing

| Prescribed vertical geogrid spacing as per Engineer | | FilterSoxx ™ wall fascia diameter | |
|---|---|---|---|
| inches | Mm | inches | mm |
| 8 | 200 | 12 | 300 |
| 12 | 300 | 18 | 450 |
| 18 | 450 | 24 | 600 |
| 24 | 600 | 30 | 750 |

Figure 1:
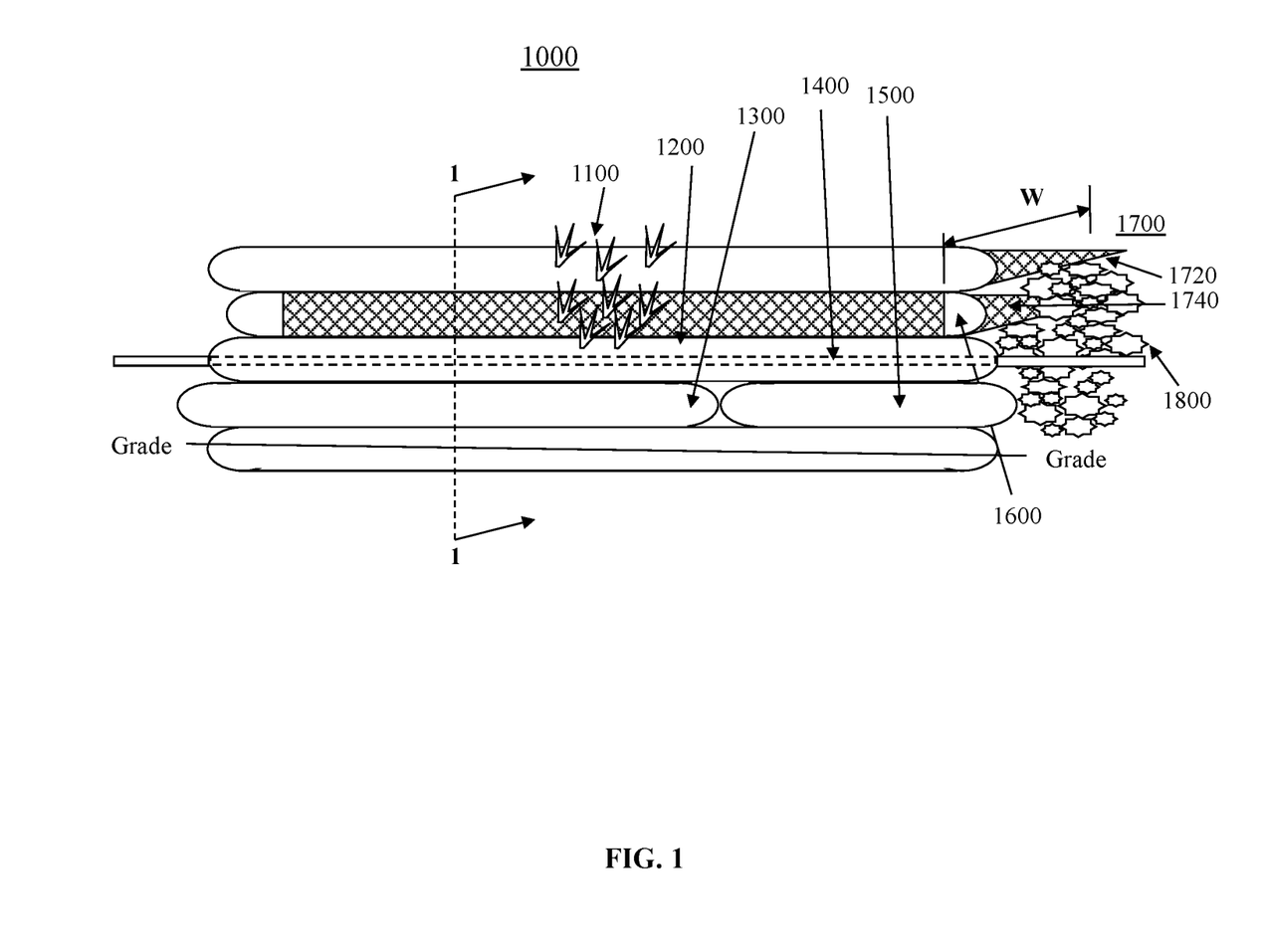
FIG. 1 is a perspective view of an exemplary GreenLoxx™ system.

FIG. 1 is a perspective view of an exemplary GreenLoxx™ system 1000, showing a plurality of plants 1100 that can be rooted in a filling of, and/or growing through the exterior walls of, tubular mesh enclosures (tubes) 1200, 1600, which can have a nominal opening size of less than 0.5 inches, and which can be stacked one directly upon and/or indirectly above the other to form a substantially vertical and/or sloped wall-like and/or terraced structure. Extending longitudinally through tube 1200 can be an irrigation mechanism 1300, such as a tube, hose, drip tape, etc., which can have a longitudinal axis that is co-incident with, parallel to, angled with respect to, and/or offset from a longitudinal axis of tube 1200. Irrigation mechanism 1300 can be inserted into tube 1200 before, during, or after tube 1200 is filled with the filling, which can be a plant growing medium. A sealed end portion of tube 1300 can be located adjacent a sealed end portion of tube 1500. Alternatively, a filled tube can be attached to a second tube in a process called sleeving, in which one tube overlaps the other by anywhere from about

TABLE 10.1

Filtrexx Soxx ™ Material Specifications.

| Material Type | 3 mil HDPE | 5 mil HDPE | 5 mil HDPE | Multi-Filament Polypropylene (MFPP) | Multi-Filament Polypropylene "Safety Soxx ™" from Filtrexx |
|---|---|---|---|---|---|
| Material Characteristic | Photodegradable | Photodegradable | Biodegradable | Photodegradable | Photodegradable |
| Design Diameters | 5 in (125 mm) 8 in (200 mm) 12 in (300 mm) 18 in (400 mm) | 5 in (125 mm) 8 in (200 mm) 12 in (300 mm) 18 in (400 mm) 24 in (600 mm) 32 in (800 mm) | 8 in (200 mm) 12 in (300 mm) 18 in (400 mm) 24 in (600 mm) 32 in (800 mm) | 8 in (200 mm) 12 in (300 mm) 18 in (400 mm) 24 in (600 mm) 32 in (800 mm) | 8 in (200 mm), 12 in (300 mm) 18 in (400 mm) 24 in (600 mm) 32 in (800 mm) |
| Mesh Opening | 3/8 in (10 mm) | 3/8 in (10 mm) | 3/8 in (10 mm) | 3/8 in (10 mm) | 1/8 in (3 mm) |
| Tensile Strength | 317 lbs/144 kg (8 in/200 mm), 581 lbs/264 kg (12 in/300 mm), 803 lbs/364 kg (18 in/450 mm) | 528 lbs/240 kg (8 in/200 mm), 969 lbs/440 kg (12 in/300 mm), 1339 lbs/607 kg (18 in/450 mm) | 528 lbs/240 kg (8 in/200 mm), 969 lbs/440 kg (12 in/300 mm), 1339 lbs/607 kg (18 in/450 mm) | 982 lbs/445 kg (8 in/200 mm), 1669 lbs/757 kg (12 in/300 mm), 2487 lbs/1128 kg (18 in/450 mm) | 1800 lbs/816 kg (8 in/200 mm), 3141 lbs/1425 kg (12 in/300 mm), 4712 lbs/2137 kg (18 in/450 mm) |
| Ultraviolet Stability % Original Strength (AS ™ G-155) | 23% at 1000 hr | 23% at 1000 hr | | 100% at 1000 hr | 100% at 1000 hr |
| Functional Longevity*/ Project Duration | 6 mo-2 yr | 9 mo-3 yr | 6-12 months | 1-4 yr | 2-5 yr |

*Functional Longevity can be based on continual UV exposure without vegetation. Once vegetation is established, longevity of the system can be greatly increased.

1 to about 4 feet, thereby effectively extending the length of the first tube. If needed, the two tubes can be attached together using, for example, twist ties, zip ties, stakes or the like. Then the filling process can continue. Additional tubes can be further attached to form an effectively continuous tube of any desired length. Tube 1600 is shown partially wrapped in a geogrid 1700, which can be uni-axial or bi-axial, can have a nominal opening size of from approximately 0.5 inches to approximately 4.0 inches, including all values and sub-ranges therebetween (e.g., from 0.8 to 3.2 inches, less than 1.53 inches, approximately 1.0 inches, etc.), and/or can extend from tube 1600 and into backfill 1800 a sufficient distance to substantially secure the position of tube 1600. As shown, geogrid 1700 is wrapped partially around tube 1600 such that tube 1600 is located in a manner that it visually divides geogrid 1700 into two substantially parallel and/or planar sub-sheets 1720 and 1740 that are separated by a portion of backfill 1800, each of sub-sheets 1720 and 1740 having a width W that is approximately one half of a width of geogrid 1700.

Figure 2:
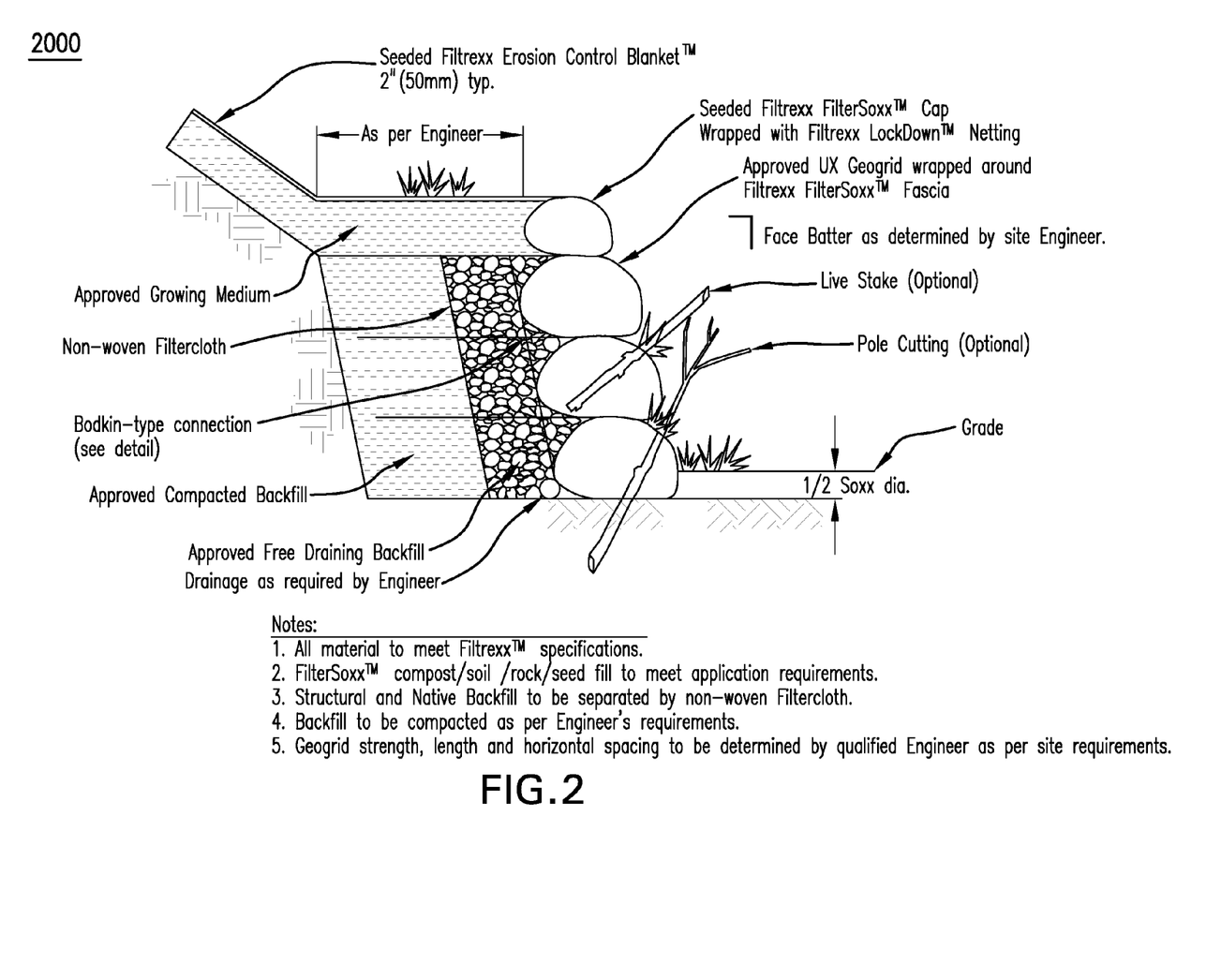
FIG. 2 is a cross-sectional view, taken, e.g., at section 1-1 of FIG. 1, of an exemplary GreenLoxx™ system.

FIG. 2 is a cross-sectional view, taken, e.g., at section 1-1 of FIG. 1, of an exemplary GreenLoxx™ system 2000, and showing tubular mesh enclosures of various shapes and sizes, several of which are substantially supported by another tubular mesh enclosure, and several of which are partially wrapped by a sheet of geogrid material which is anchored by backfill. Also shown are various types of plantings that are rooted in a plant-growing medium contained within each tubular mesh enclosure, the plantings growing through openings in the exterior wall of the tubular mesh enclosure and through openings in the geogrid.

Figure 3:
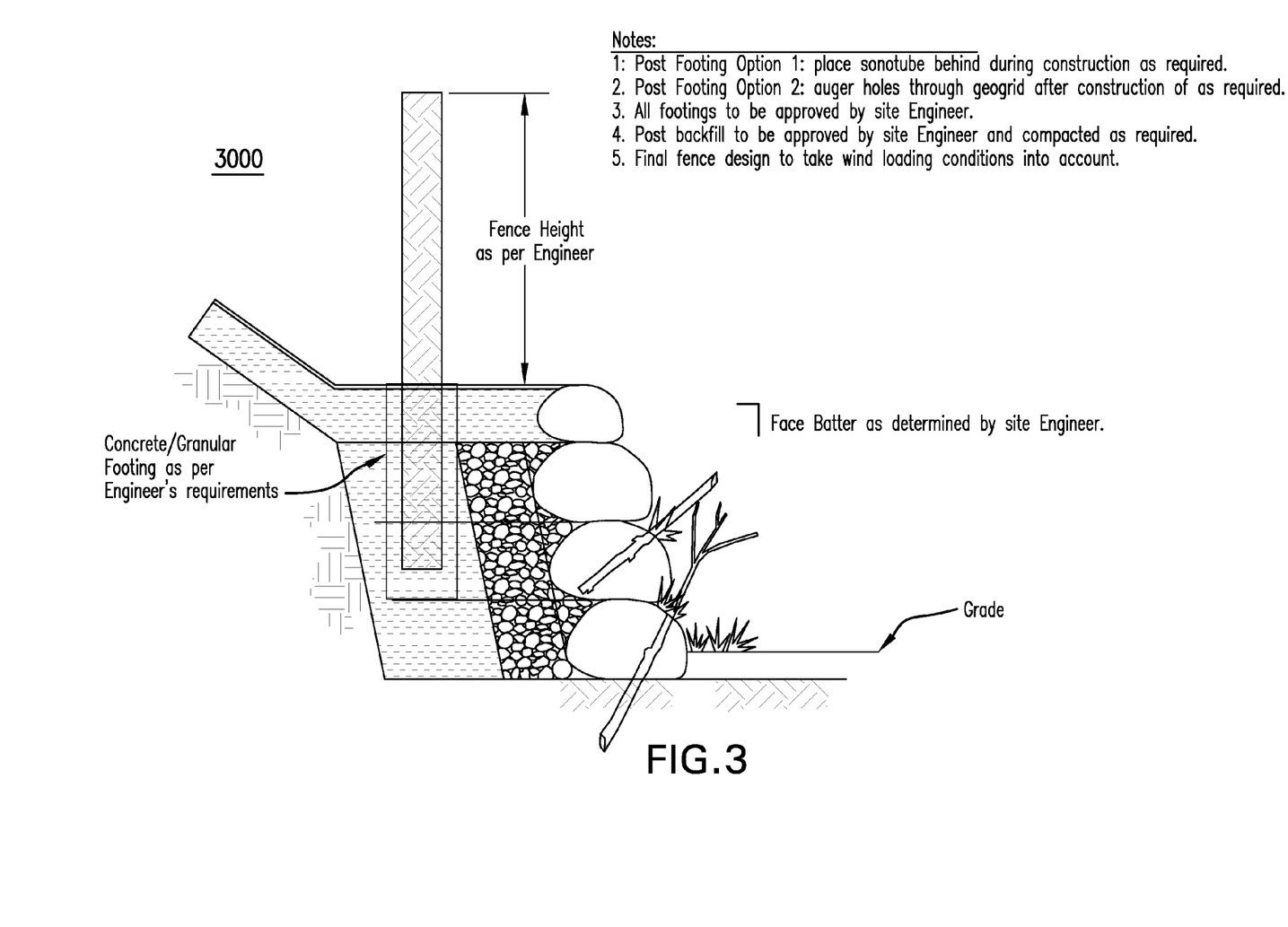
FIG. 3 is a cross-sectional view, taken, e.g., at section 1-1 of FIG. 1, of an exemplary GreenLoxx™ system comprising a fence post.

FIG. 3 is a cross-sectional view, taken, e.g., at section 1-1 of FIG. 1, of an exemplary GreenLoxx™ system 3000 comprising a fence post secured behind a wall-like structure by a footing.

Figure 4:
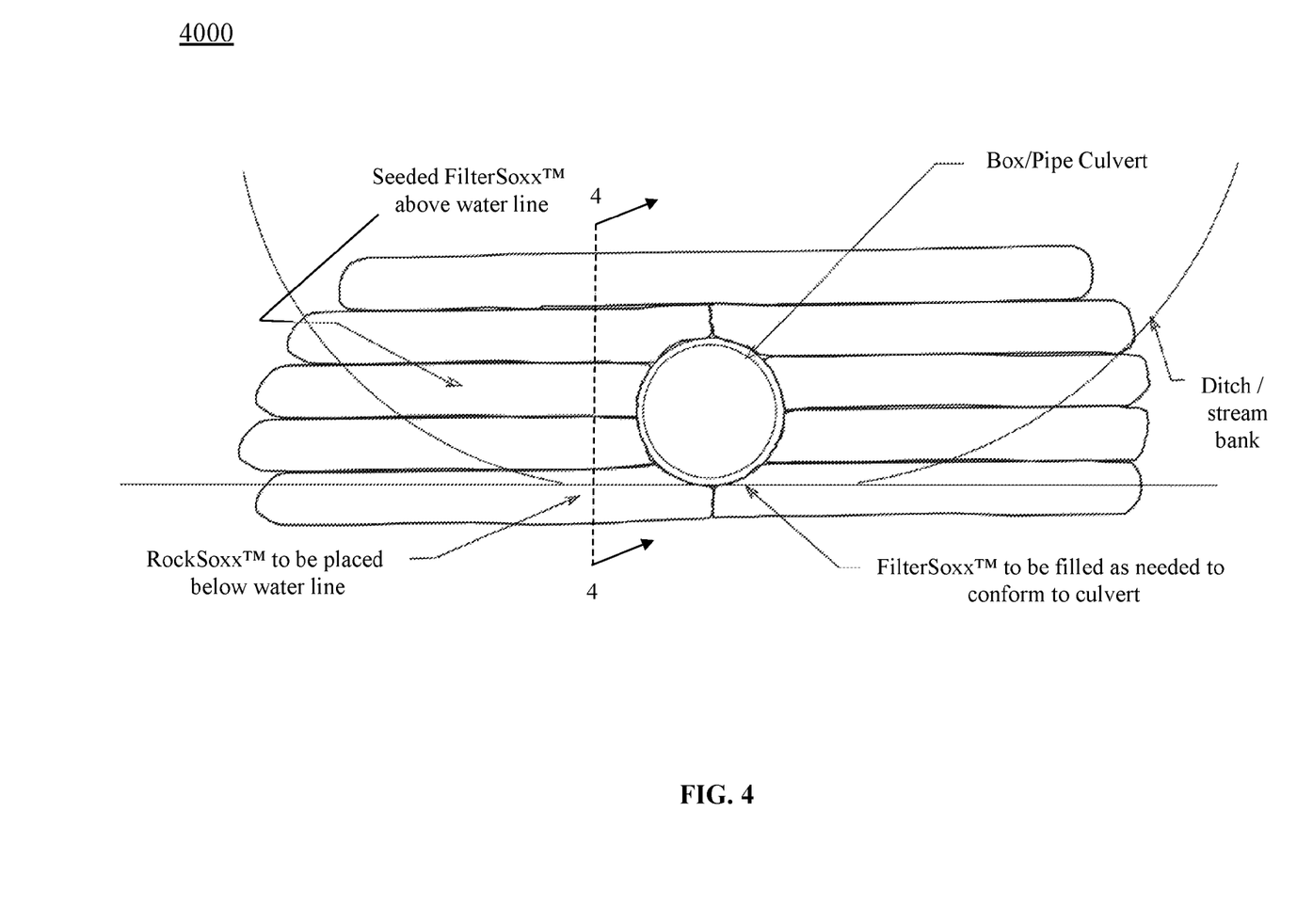
FIG. 4 is a front view of an exemplary GreenLoxx™ system comprising a culvert.

FIG. 4 is a front view of an exemplary GreenLoxx™ system 4000 comprising a culvert. The shown FilterSoxx™ can comprise a filling, such as Filtrexx GrowingMedia™, that can comprise compost, soil, rock, and/or seed. Compost can provide a good substrate to provide physical, chemical, and/or biological filtration. During effective composting processes, weed seeds, pathogens, and/or insects can be killed. Composting also can increase surface area of adsorptive and/or absorbtive sites for better filtration. Compost typically weighs about 1000 to 1200 lbs per cubic yard of material. Riprap can be used with or in place of the shown Filtrexx RockSoxx™.

Figure 5:
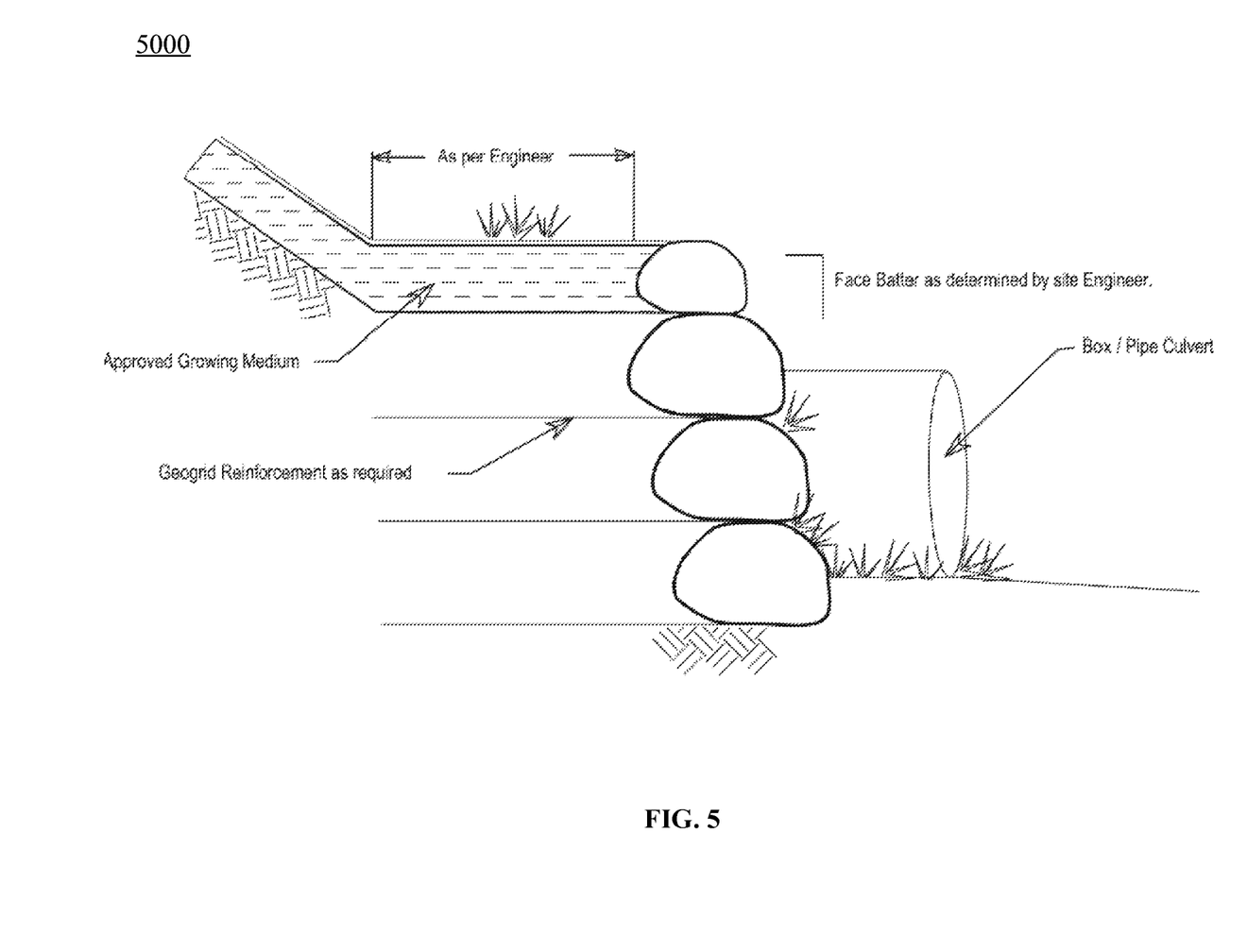
FIG. 5 is a cross-sectional view, taken, e.g., at section 4-4 of FIG. 4.

FIG. 5 is a cross-sectional view, taken, e.g., at section 4-4 of FIG. 4, of an exemplary GreenLoxx™ system 5000 comprising a culvert.

Figure 6:
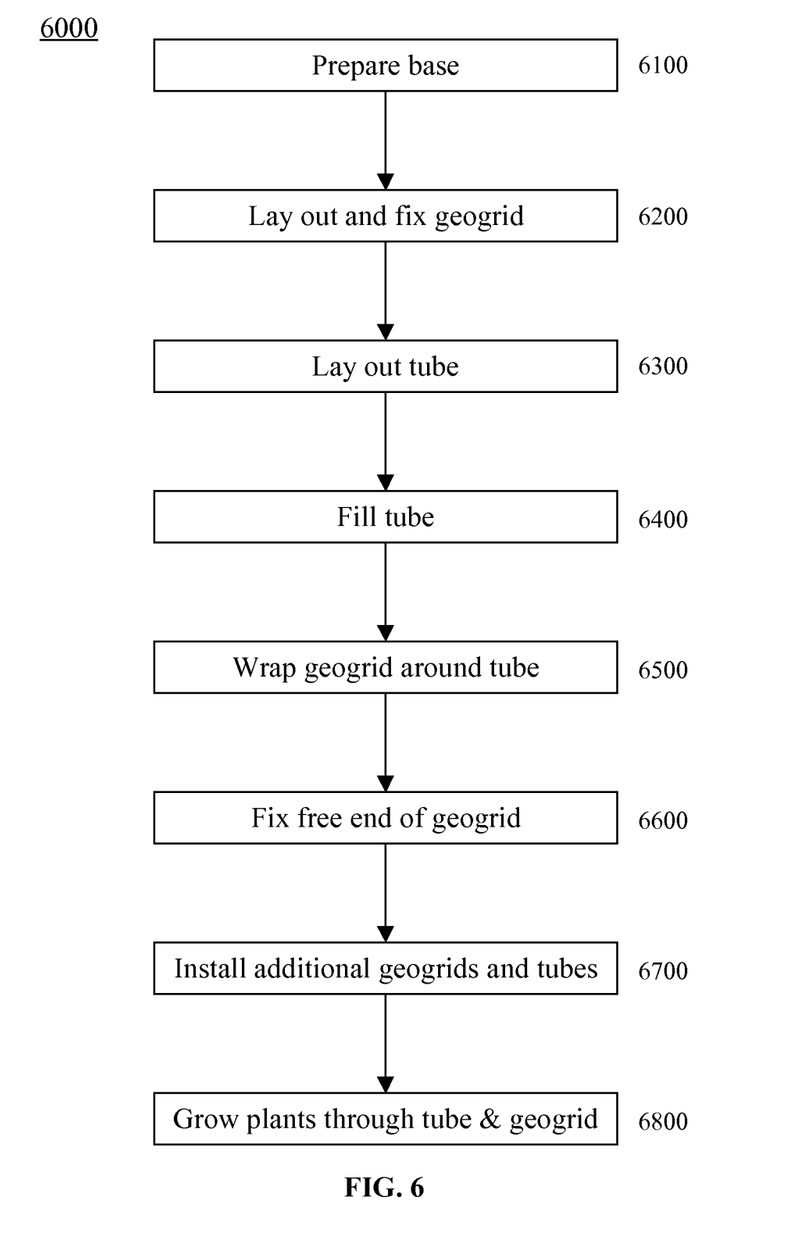
FIG. 6 is a flowchart of an exemplary method.

FIG. 6 is a flowchart of an exemplary embodiment of a method 6000. At activity 6100, a base can be prepared upon which a GreenLoxx™ wall can be constructed. At activity 6200, a sheet of geogrid can be laid out over the base and one end region of the geogrid can be staked, anchored, and/or covered with backfill, thereby defining a fixed end and a free end of the geogrid. At activity 6300, a tubular mesh enclosure having a sealed end can be laid over an unstaked, unanchored, and/or uncovered portion of the geogrid located approximately mid-way between the fixed end and the free end. At activity 6400, the tubular mesh enclosure can be filled in place with a filling that comprises a plant-growing medium. At activity 6500, the open end of the filled tubular mesh enclosure can be sealed and the free end of the geogrid wrapped partially around the filled tubular mesh enclosure such that the geogrid is wrapped to form two substantially parallel and/or planar sub-sheets (see half-sheets 1720 and 1740 of geogrid sheet 1700 of FIG. 1). At activity 6600, the free end of the geogrid can be staked, anchored, and/or covered with backfill. At activity 6700, the process can be repeated, such that a second wrapped filled tubular enclosure is installed over and/or supported by the first wrapped filled tubular enclosure. At activity 6800, plants can be germinated within the filling(s) and/or installed through the geogrid(s) and the tubular mesh enclosure(s) such that the plants take root and begin growing through the geogrid(s) and the tubular mesh enclosure(s).

Thus, certain exemplary embodiments can provide a system comprising: a first tubular mesh enclosure having a first opposing pair of ends, at least one of said first opposing pair of ends sealed; a first filling surrounded by said first tubular mesh enclosure; a first geogrid wrapped at least partially around said first tubular mesh enclosure.

Definitions

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.

absorb—to take up or receive by chemical or molecular action.

activity—an action, act, step, and/or process or portion thereof adapted for—made suitable and/or fit for a specific use and/or situation.

adapted to—made suitable and/or fit for a specific use and/or situation.

adjacent—in close proximity to, near, next to, and/or adjoining.

amount—a quantity.

and/or—either in conjunction with or in alternative to.

annual—a plant that typically lives for only one growing season.

apparatus—an appliance or device for a particular purpose around—on all sides; about.

at least—not less than.

backfill—material used for refilling an excavation.

beneficial—conferring benefit; advantageous; helpful.

bind—to combine with, form a chemical bond with, and/or be taken up by.

bulb—a usually subterranean and often globular bud having fleshy leaves emergent at the top and a stem reduced to a flat disk, rooting from the underside, as in the onion and lily.

can—is capable of, in at least some embodiments.

capture—to bind, catch, take possession of, take control of, and/or hold.

comprising—including but not limited to.

contaminant—an undesired chemical and/or biological material.

degrade—to break down and/or decompose.

device—a machine, manufacture, and/or collection thereof.

distance—a measure of physical and/or logical separation.

dormant—in a state of minimal metabolic activity with cessation of growth, either as a reaction to adverse conditions or as part of an organism's normal annual rhythm.

drip tape—a type of irrigation hose having factory-installed emitters and/or holes used to apply a relatively small amount of water directly at the point of use; contrast—with hose-supplied sprinklers.

enclosure—a structure that encloses.

ends—a terminal portion.

establish—to create, form, and/or set-up.

extending—existing, located, placed, and/or stretched lengthwise.

filling—a content of a tube subsequent to a fill operation, which can provide the filling to the tube pneumatically, via auger, manually, etc., as explained in U.S. Patent Application Publication 2005/0254899A1, which is incorporated by reference herein in its entirety.

fix—to make fast, firm, and/or stable; and/or to place definitely and/or more or less permanently.

formed—constructed.

from—to indicate a source.

further—in addition.

geogrid—a mesh, typically synthetic, fabric that is generally provided in flexible sheet form; can include geotextiles, geonets, geomembranes, and/or geocomposites.

grass—any plant of the family Gramineae, having jointed stems, sheathing leaves, and seedlike grains.

groundcover—any of a variety of low-grooving and/or trailing plants used to cover the ground in areas where grass is difficult to grow, as in dense shade and/or on steep slopes.

growing medium—a material adapted to increase by natural development, as any living organism or part by assimilation of nutriment, and/or to increase in size or substance.

having—comprising.

hose—a flexible tube for conveying a liquid, as water, to a desired point.

humus—a dark organic substance comprising partially and/or wholly decayed vegetable and/or animal matter that provides nutrients for plants and increases the ability of soil to retain water.

hydrocarbon—an organic chemical containing only hydrogen and carbon.

inorganic—not carbon-based and/or not living and/or previously living.

into—to a condition, state, or form of irrigation—the artificial application of water to land to assist in the germination, growth, maintenance, and/or production of plants.

less than—having a measurably smaller magnitude and/or degree as compared to something else.

live stake—a living woody plant cutting that will tolerate cutting and still be capable of quickly establishing a new root system.

material—any substance that can be excavated and/or scooped.

may—is allowed and/or permitted to, in at least some embodiments.

mesh—any knit, woven, and/or knotted fabric of open texture and/or an interwoven and/or intertwined structure metal—an element yielding positively charged ions in aqueous solutions of its salts.

method—a process, procedure, and/or collection of related activities for accomplishing something.

microbe—a microorganism.

microorganism—any organism too small to be viewed by the unaided eye, such as bacteria, protozoa, fungi, and/or algae nominal—a title by which a thing is known and/or designated.

nutrients—any substance (such as a chemical element and/or inorganic compound) that can be taken in by a green plant and used in organic synthesis.

opening—an aperture.

opposing—opposite; against; being the other of two complementary or mutually exclusive things; placed or located opposite, in contrast, in counterbalance, and/or across from something else and/or from each other.

organic chemical—any member of a large class of chemical compounds whose molecules comprise at least carbon and hydrogen; therefore, carbides, carbonates, carbon oxides, and elementary carbon are excluded.

organic matter—partially and/or wholly decayed vegetable and/or animal matter.

pair—a quantity of two of something.

partially—to a degree, but not necessarily totally.

perennial—a plant having a life cycle typically lasting more than two years.

plant—any organism of the kingdom Plantae, whether unharvested or harvested. Examples include crops, grains, tobacco, trees, nuts, flowers, vegetables, fruits, berries, and/or produce, etc.

plant growing medium—any material capable of supporting plant life including soil, sand, and/or compost.

plug—a small but well-rooted seedling.

plurality—the state of being plural and/or more than one.

position—(n) a place and/or location, often relative to a reference point. (v) to place and/or locate.

positioned—to put in place or position.

predetermined—established in advance.

provide—to furnish, supply, give, convey, send, and/or make available.

recycle—to treat and/or process (e.g., used and/or waste materials) so as to make suitable for reuse.

rhizome—a rootlike subterranean stem, commonly horizontal in position, that usually produces roots below and sends up shoots progressively from the upper surface.

root—to send out roots and/or begin to grow.

rootstock—a rhizome and/or a root and its associated growth buds, used as a stock in plant propagation.

said—when used in a system or device claim, an article indicating a subsequent claim term that has been previously introduced.

seal—to shut close, keep close, make fast, keep secure, and/or prevent leakage.

seed—a fertilized, matured ovule of a flowering plant, containing an embryo or rudimentary plant.

set—a related plurality.

shrub—a woody plant smaller than a tree, usually having multiple permanent stems branching from or near the ground.

size—physical dimensions, proportions, magnitude, amount, and/or extent of an entity.

slow release—to slowly let go and/or free from something that restrains, binds, fastens, and/or holds back.

soluble—capable of being dissolved or liquefied specifically—in a specified, precise, and/or particular manner.

sprig—a shoot, twig, and/or small branch of a plant.

stability—a firmness in position and/or resistance to change in position.

stabilize—to make and/or keep stable.

structural—load-bearing and/or of, relating to, or affecting structure.

substantially—to a considerable, large, and/or great, but not necessarily whole and/or entire, extent and/or degree.

sufficient—to a degree necessary to achieve a predetermined result.

supply—make available for use.

support—to bear the weight of, especially from below.

surround—to encircle, enclose, and/or confine on several and/or all sides.

sustainability—maintenance.

system—a collection of mechanisms, devices, machines, articles of manufacture, processes, data, and/or instructions, the collection designed to perform one or more specific functions.

through—in one side and out the opposite or another side of, across, among, and/or between.

toxic—of, pertaining to, affected with, or caused by a toxin or poison tube—an elongate member having a longitudinal axis and defining a longitudinal cross-section resembling any closed shape such as, for example, a circle, a non-circle such as an oval (which generally can include a shape that is substantially in the form of an obround, ellipse, limaçon, cardioid, cartesian oval, and/or Cassini oval, etc), and/or a polygon such as a triangle, rectangle, square, hexagon, the shape of the letter "D", the shape of the letter "P", etc. Thus, a right circular cylinder is one form of a tube, an elliptic cylinder is another form of a tube having an elliptical longitudinal cross-section, and a generalized cylinder is yet another form of a tube. A tube can be formed of a mesh material, and can be filled with a filler material.

tuber—a thickened part of an underground stem of a plant, such as the potato, bearing buds from which new plant shoots arise.

tubular—shaped substantially like a tube and/or pipe; and/or having a hollow, substantially cylindrical shape.

via—by way of and/or utilizing.

vine—any plant having a weak, long, and/or slender stem that trails and/or creeps on the ground and/or climbs by winding itself about a support and/or holding fast with tendrils and/or claspers.

wherein—in regard to which; and; and/or in addition to.

wildflower—a plant that normally grows in fields, forests, etc., without deliberate cultivation.

wrap—to wind, cradle, fold, or bind (something) about as a covering and/or support.

NOTE

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive.

What is claimed is:

1. A backfill-anchored wall system configured to stabilize or retain an earthen slope, the system comprising:
   a synthetic first mesh tube that defines a first course of a retaining wall, the first mesh tube extending a length of the retaining wall, the first mesh tube surrounding a first quantity of plant-growing medium, the first mesh tube formed from a mesh material having a mesh opening size of approximately 0.125 inches to approximately 0.375 inches;
   a synthetic second mesh tube that defines a second course of the retaining wall, the second mesh tube extending the length of the retaining wall, the second mesh tube surrounding a second quantity of plant-growing medium, the second mesh tube in contact with and substantially vertically supported by the first mesh tube;
   a synthetic first geogrid sheet wrapped at least partially around a first portion of the first mesh tube while covering a first portion of a first exposed tube surface of the retaining wall and wrapped at least partially around a first portion of the second mesh tube while covering a first portion of a second exposed tube surface, said first tube located substantially adjacent said second tube, each of two opposing end regions of the first geogrid sheet anchored into position by backfill, the first geogrid sheet defining a first pair of substantially planar geogrid flat portions that are separated by a portion of the backfill, a length dimension of the first geogrid sheet oriented substantially perpendicular to an axial length of the first mesh tube; and the system configured for a first plurality of plants to root in the first quantity of plant-growing medium and to extend through the first mesh tube and the first geogrid sheet to form a first vegetated portion of a vegetated wall surface.

2. The system of claim 1, wherein:
the first mesh tube defines a first plurality of mesh openings.

3. The system of claim 1, wherein:
the first mesh tube defines a first plurality of mesh openings, each mesh opening from the first plurality of mesh openings sufficiently sized to allow a plant root to extend therethrough.

4. The system of claim 1, wherein:
the first geogrid sheet defines a first array of grid openings.

5. The system of claim 1, wherein:
the first geogrid sheet defines a first array of grid openings, each grid opening from the first array of grid openings sized to allow a plant root to extend therethrough.

6. The system of claim 1, wherein:
the second mesh tube at least partially surrounding an inorganic material.

7. The system of claim 1, wherein:
the first quantity of plant-growing medium surrounds a first irrigation hose.

8. The system of claim 1, wherein:
the first quantity of plant-growing medium surrounds a first irrigation drip tape.

9. The system of claim 1, wherein:
the first quantity of plant-growing medium is specifically configured for establishment and/or sustainability of the first plurality of plants.

10. The system of claim 1, wherein:
the first quantity of plant-growing medium is specifically configured for stabilizing the system.

11. The system of claim 1, wherein:
the first quantity of plant-growing medium is configured to bind and/or absorb soluble nutrients, metals, contaminants, hydrocarbons, and/or organic chemicals.

12. The system of claim 1, wherein:
the first quantity of plant-growing medium comprises microorganisms configured to degrade and/or recycle captured nutrients, metals, contaminants, and/or organic chemicals into beneficial and/or less toxic forms.

13. The system of claim 1, wherein:
the first quantity of plant-growing medium comprises humus, organic matter, beneficial microbes, and/or slow release organic nutrients.

14. The system of claim 1, wherein:
the first quantity of plant-growing medium comprises seeds, dormant rootstocks, and/or bulbs.

15. The system of claim 1, wherein:
the first plurality of plants comprises plugs, live stakes, tubers, rhizomes, and/or sprigs.

16. The system of claim 1, wherein:
the first plurality of plants comprises grasses, vines, groundcovers, wildflowers, perennials, annuals, and/or small shrubs.

17. The system of claim 1, wherein:
the second mesh tube has a substantially circular cross-section.

18. The system of claim 1, wherein:
the first geogrid sheet is in contact with the first mesh tube.

19. The system of claim 1, wherein:
the first geogrid sheet is in contact with the second mesh tube.

20. The system of claim 1, wherein:
each of the two opposing end regions of the first geogrid sheet are anchored into position solely by the backfill.

* * * * *